June 9, 1964

J. P. CASSIDY 3,136,031

TOOL HOLDER

Filed July 11, 1961

INVENTOR.
JAMES P. CASSIDY
BY
RICHEY, McNENNY, & FARRINGTON
Donald W. Farrington
ATTORNEYS June 9, 1964  J. P. CASSIDY  3,136,031
TOOL HOLDER
Filed July 11, 1961  2 Sheets-Sheet 2
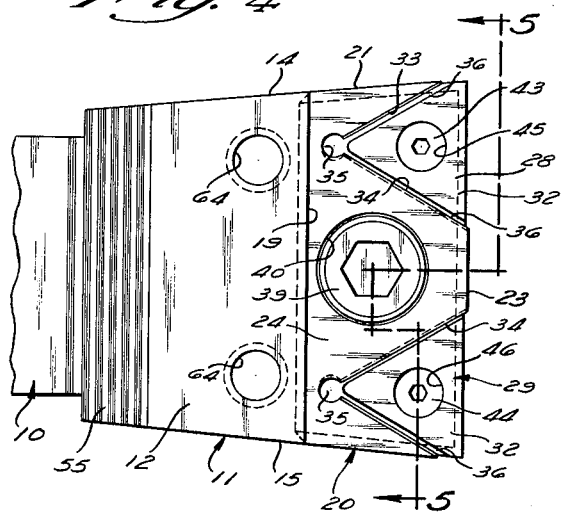
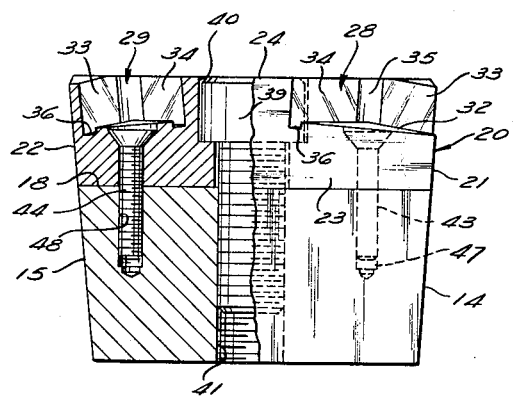
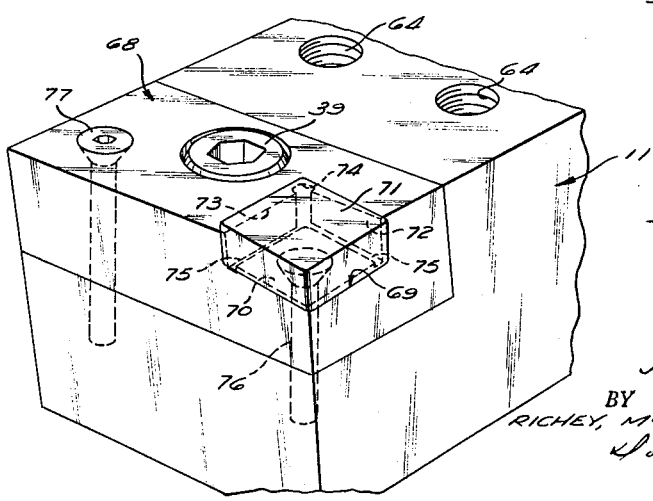
INVENTOR.
JAMES P. CASSIDY
BY
RICHEY, McNENNY, & FARRINGTON
Donald W. Farrington
ATTORNEYS

United States Patent Office 3,136,031
Patented June 9, 1964

3,136,031
TOOL HOLDER
James P. Cassidy, 187 Linden Ave. SE., Warren, Ohio
Filed July 11, 1961, Ser. No. 123,184
1 Claim. (Cl. 29—97)

This invention relates generally to cutting tool holders and more particularly to cutting tool holders for use on lathes and similar machine tools which employ replaceable cutting inserts of cemented carbides and similar materials.

It is among the objects of this invention to provide a tool holder in which a single shank can employ either single or double replaceable cutting inserts of different shapes such as squares, triangles and the like.

It is another object of this invention to provide a tool holder for positioning and supporting indexable cutting inserts of the "throw away" type in which no hardened seat insert or shim is required for support beneath the carbide cutting insert.

It is another object of this invention to provide a tool holder of the replaceable insert type which provides a pair of cutting inserts mounted so that the tool can be used for two separate cuts, one by each insert, such as longitudinal turning along the inside and outside of a cylindrical workpiece.

It is another object of this invention to provide a tool holder having a shank and an insert support block which is replaceable with other support blocks to allow use on the same shank of inserts having different shapes and which may be mounted to provide different arrangements of the tool geometry of the insert.

It is still another object of this invention to provide a tool holder having an insert support block formed in one piece which rigidly supports and precisely positions an indexable cutting insert at both the bottom and sides without employing any additional positioning members or support shims to avoid variations in tool geometry and position of the cutting edge.

Further objects and advantages of the present invention relating to simplicity of construction, versatility of application, and low cost of manufacture will readily become apparent to those skilled in the art upon a more complete understanding of the invention as shown in the drawings, described in the following detailed description and defined in the appended claim.

In the drawings:

FIG. 4 is a fragmentary top plan view of the tool holder with the inserts and clamps removed;

FIG. 5 is an elevational view partly in section taken along line 5—5 of FIG. 4; and FIG. 6 is a perspective view with the insert clamp removed of another embodiment of the invention employing a single square insert.

Figure 1:
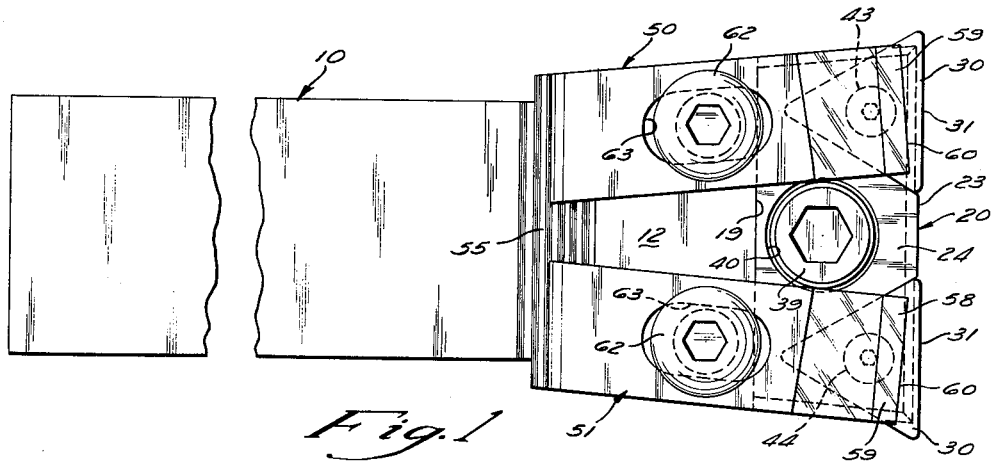
FIG. 1 is a top plan view of a tool holder embodying the present invention.

Referring now to the drawings in greater detail, the tool holder has a shank 10 which is rectangular in cross section with parallel top and bottom surfaces for clamping in a turret tool post or other support on the cross slide of a lathe or similar machine tool. At one end the shank has an enlarged head portion 11 which includes a top surface 12 coextensive with the top surface of the shank together with an end face 13 and side faces 14 and 15. These faces 13, 14 and 15 taper downwardly and inwardly at an angle of preferably about 5° to provide the proper clearance angles as is well known in the art. The shank is preferably made of an alloy steel such as AISI 4150 steel to provide the necessary strength and rigidity, although it is understood that other steels can be used for this purpose.

The upper end portion of the head 11 has a transversely extending notch 17 formed thereon and extending across the head between the side faces 14 and 15. This notch is formed by a horizontal face 18 and a slanting vertical face 19 which tapers upwardly and outwardly toward the end at an angle of approximately 5° so that the faces 18 and 19 have an included angle of about 85°. A support block 20 having a shape substantially the same as the notch is mounted therein to abut firmly against the horizontal and vertical surfaces 18 and 19. When so positioned, the support block 20 has side faces 21 and 22 which are substantially coplanar with the side faces 14 and 15 on the head, and likewise has a front face 23 coplanar with end face 13 of the head and a top face 24 coplanar with the top surface 12 of the head and shank.

Figure 2:
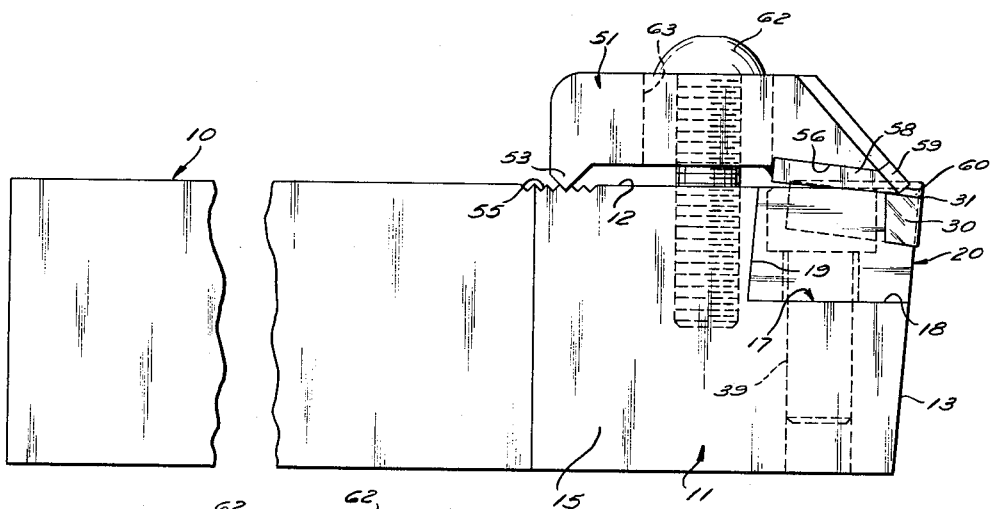
FIG. 2 is a side elevational view of the tool holder of FIG. 1.
Figure 3:
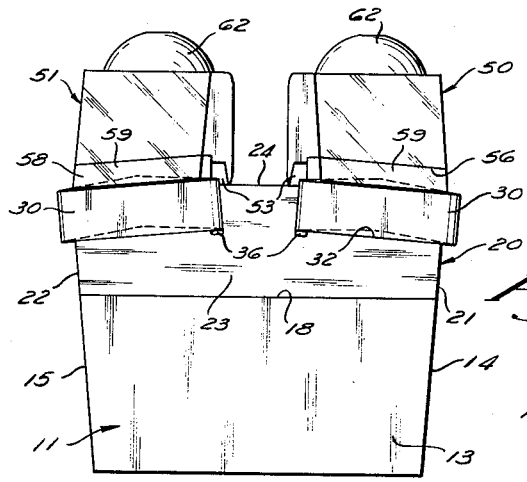
FIG. 3 is an end elevational view of the tool holder.

In the embodiment of FIGS. 1 through 5, the support block 20 is formed with two recesses 28 and 29 to receive triangular inserts 30 of cemented carbide or other similar material. These inserts 30 are of the "throw away" or disposable type, and in the present arrangement are employed in a negative rake cutting position, with one edge 31 projecting from and parallel with the front face 23 of the support block. It will be understood that this type of insert provides six individual cutting edges, and after one edge is worn, the insert is removed and indexed to a new position by rotating the insert and/or turning it over. After all six cutting edges have been used the insert is discarded. The two recesses 28 and 29 are positioned on the left and right sides, respectively, of support block 20 to give appropriate geometry to hold the insert for either a right hand or left hand tool, respectively. Thus in the negative rake tool holder shown, these recesses position the insert to slope downwardly and outwardly toward both the head end and the adjacent side face at an angle of approximately 5° negative rake.

Except for the rake angle, the recesses 28 and 29 are otherwise identical and each comprises a flat bottom surface 32 and a pair of converging side faces 33 and 34 extending perpendicular to the plane of the bottom face 32. It will be appreciated that since the inserts 30 have parallel top and bottom faces and sides extending perpendicular to these top and bottom faces, the rake angle of the bottom surface 32 of the recess will determine the rake angle of the insert. When the insert is positioned within the recess, it is in firm, surface abutting contact with both the bottom surface 32 and the side faces 33 and 34. To avoid concentration of stresses at the corners and edges of the insert, a relief space 35 is formed adjacent the intersection of the side faces 33 and 34 to receive the apex of the insert, and relief grooves 36 are formed along the bottom face 32 adjacent the side faces 33 and 34. Thus the insert will be supported on the bottom surface only at the central portion spaced away from the edges and along the sides only in the central section spaced from the corners.

The support block 20 is rigidly clamped to the head 11 by means of a socket head cap screw 39 which is recessed into a counterbore 40 in the support block intermediate the insert recesses 28 and 29. The screw 39 has a threaded shank which is received within a threaded bore 41 in head 11, and thus firmly clamps the support block against the horizontal notch face 18. Additional clamping is provided by screws 43 and 44 located at the bottom of the insert recesses 28 and 29. These screws fit within counterbores indicated at 45 and 46 and have threaded shanks received in threaded bores 47 and 48 in the tool holder head 11. Thus the screws 43 and 44 provide additional clamping and position of the support block against the horizontal face 18 and insure that the support block will be securely clamped in the zone directly beneath the insert recesses.

The inserts 30 are firmly clamped within the recesses 28 and 29 by a pair of clamp members 50 and 51. These clamp members 50 and 51, like the recesses 28 and 29, show a symmetry reflected about the longitudinal axis of the shank 10. The clamps have a depending pointed tooth portion 53 which engages one of a plurality of transversely extending parallel V-grooves 55 on the top surface 12 of the head and shank of the tool holder. According to which V-groove the tooth 53 engages, the axial position of the clamp relative to the insert 30 will be determined. At the other end, the clamp has a recessed bottom surface 56 which presents a planar surface extending parallel to the top surface of the insert 30 and the recess bottom face 32 a spaced distance away therefrom. A chip breaker insert 58 is brazed in place within this recess 56 and has parallel top and bottom surfaces so that its lower surface makes surface abutting contact against the top of the insert 30 when the tooth portion 53 is aligned within one of the V-grooves 55. It will be noted that the chip breaker insert 58 has a bevelled face 59 which tapers to an edge 60 adjacent the top of the insert, and that this edge 60 tapers at an angle of substantially 5° to the edge of the insert. Each of the clamps 50 and 51 is held in place by a suitable cap screw 62 which passes through an elongated slot 63 in the mid portion of the clamp and has a shank engaging a threaded bore 64 formed in the tool holder head 11. Thus the clamps 50 and 51 not only serve to firmly clamp the insert 30 in the respective recesses, but also carry the chip breaker insert 58 integrally therewith. The position of the chip breaker relative to the insert 30 may be selected by engaging the tool portion 53 in the appropriate one of the V-grooves 55.

The tool holder described above allows two separate cuts or operations to be made by the same tool holder, since it provides both a left hand and right hand insert in cutting position. In the arangement shown, with the front edges 31 of the insert 30 extending parallel with the end face 13 of the head, cuts can be made both parallel to and transverse to the longitudinal axis of the tool holder shank 10. The chip breaker insert 58 functions in both cutting directions, since it is inclined at an angle to the front insert edge 31 and therefore exposes the bevelled surface 59 when the tool holder is used for cutitng transversely to the axis of the shank.

With the present arrangement, the provision of two separate cutting inserts in one tool can allow two cutting operations to take place without repositioning or replacing the tool holder. For example, in a lathe the tool holder may be mounted on the cross slide to extend parallel to the spindle axis. In such case, when machining a cylindrical workpiece the insert in the right hand recess 29 can be used for turning the outer surface of the cylinder, after which the tool holder can be repositioned and the insert in the left hand recess 28 employed for machining the internal bore of the workpiece without reversing the direction of rotation of the spindle.

It is well known that replaceable inserts are made in a variety of shapes such as squares, rectangles and round buttons in addition to the triangular shape shown with the tool holder of FIGS. 1 through 5. According to the present invention the support block 20 may be removed and replaced by a different support block having appropriate recesses to receive an insert of a different configuration, or else a triangular insert in a different orientation. These support blocks may be interchanged on the same tool holder shank 10 and thus allow a single shank to be used in conjunction with all styles of inserts.

An example of another style of support block is shown in FIG. 6. The support block 68 is mounted on the tool holder head 11 and clamped in place by the socket head cap screw 39. A recess 69 is formed on the corner of the support block 68 and is shown as having a bottom face 70 inclined forwardly and sidewardly approximately a 5° angle to hold the insert 71 in a negative rake position. Insert 71 is shown of the square type and has a bottom face which seats on the bottom recess face 70 and has side faces which abut against side faces 72 and 73 of the recess. The recess is formed with a relief space 74 and relief grooves 75 to avoid stress concentrations at the corner and edges of the insert. The support block 68 is also clamped to the tool holder by a screw 76 similar to screw 43 positioned below the recess 69 and extending downward to engage the tool holder head 11. Further clamping is also provided by a second screw 77 on the other corner of the support block and located at the same place as screw 44 and the previously described embodiment to make threaded engagement with the bore 48 in the tool holder head 11. Thus whether the support block is provided with one or two recesses for inserts, the arrangement of clamping screws is the same. It will also be understood that a clamp and chip breaker (not shown) is employed to clamp the insert 71 tightly in the recess 69 in the aforedescribed manner.

An important feature of this invention lies in the construction of the support block which permits the insert to be rigidly supported and positioned without requiring a separate carbide shim or insert beneath the cutting insert. This is accomplished partly by the shape of the support block which allows it to be fabricated as a precision or investment casting from a suitable alloy steel such as AISI 4140 steel and allows use of the support block in the as cast condition without any machining or heat treatment. The above described steel in cast form will preferably have a hardness in the range of Rockwell C 30 to 35 and an accompanying tensile strength between 142,000 and 160,000 p.s.i. A support block having this hardness and strength provides adequate support for the carbide insert to prevent possible cracking or chipping of the insert, and by the use of the precision casting process, the tolerances can be held sufficiently close that no machining of the support block is necessary.

While the large socket head cap screw 39 rigidly positions the support block in the notch 17 on the tool holder head, the acute angle formed by the horizontal face 18 and the vertical face 19 of notch 17 functions as a dovetail which further prevents rocking of the support block about an axis transverse to the tool holder shank. Transverse rocking of the support block is prevented by the screws 43 and 44 beneath the cutting inserts. For example, when the insert in the left hand recess 28 is cutting, the downward force component acting on this portion of the support block tends to rock the support block transversely about a longitudinal axis intermediate the sides. The screw 44 beneath the other recess 29 now acts on a comparatively long lever arm relative to the rocking axis as compared to the length of the lever arm of the downward force component on the insert and therefore is effective to prevent rocking about this axis. Furthermore the action of the clamp 51 holding the insert in the other recess 29 also aids the screw 44 in resisting deflection of the support block on the tool holder shank under the cutting forces. Thus by using a support block precision cast to close tolerances it is possible to employ steel alloy having sufficient rigidity in the as cast condition to support the carbide cutting insert directly, and the relative positions of the screws holding the support block to the shank together with the insert clamps provide a rigid positioning for the support block which prevents any possible shifting movement or flexing of the support block relative to tool holder shank.

While several embodiments of the invention have been shown and described in detail, it is appreciated that other modifications and arrangements of the tool holder and cutting inserts will readily become apparent to those skilled in the art upon a complete understanding of the invention, and such arrangements and modifications may be resorted

What is claimed is:

A tool holder comprising a shank having a head portion thereon, said head portion having a notch on the upper side thereof adjacent the outer end, said notch having a horizontal bottom surface and a vertically extending side surface, said bottom surface and said side surface intersecting at an acute angle, said notch surfaces extending transversely across said head portion from side to side, a support block in said notch extending lengthwise between the sides of said head portion, said support block making surface abutting contact with the surfaces of said notch, said support block having an insert recess on the upper side at each of the two exposed corners, each of the recesses having a bottom surface defining the rake angle of the insert, each of said recesses having side surfaces extending upward from the bottom surface, an insert in each of said recesses making surface abutting contact with the bottom surface and side surfaces thereof, screw means securing said support block to said horizontal notch surface, said screw means including a first screw extending vertically downward intermediate said recesses and a vertically extending screw below each of said recesses, a separate rigid clamp member adapted to secure each of said inserts within its recess, each of said clamp members having one end bearing on the upper side of said insert, the other end of each of said clamp members being engaged in a recess on the upper side of said shank, an opening intermediate the ends of each of said clamp members, and a screw extending downward through said opening to be threadedly received in said shank whereby said clamp members provide a downward clamping force securing said inserts in said recesses and securing said support block against said horizontal notch surface.

References Cited in the file of this patent

UNITED STATES PATENTS

| | | |
|---|---|---|
| 1,629,667 | Knipple | May 24, 1927 |
| 2,425,242 | Herring | Aug. 5, 1947 |
| 2,645,003 | Thompson | July 14, 1953 |
| 2,687,563 | Bader | Aug. 31, 1954 |
| 2,734,256 | Forward | Feb. 14, 1956 |
| 2,887,760 | Armstrong | May 26, 1959 |
| 2,949,662 | Cook | Aug. 23, 1960 |
| 3,052,952 | Bader | Sept. 1, 1962 |
| 3,059,316 | Bader | Oct. 23, 1962 |

FOREIGN PATENTS

| | | |
|---|---|---|
| 552,346 | Italy | Dec. 1, 1956 |
| 195,722 | Austria | Feb. 25, 1958 |